United States Patent [19]

Bergsma

[11] Patent Number: 4,907,616
[45] Date of Patent: Mar. 13, 1990

[54] CHECK VALVE ASSEMBLY
[75] Inventor: Rudolph Bergsma, Ann Arbor, Mich.
[73] Assignee: G.T. Products, Inc., Ann Arbor, Mich.
[21] Appl. No.: 232,002
[22] Filed: Aug. 15, 1988
[51] Int. Cl.⁴ .............................................. F16K 15/02
[52] U.S. Cl. ...................................... 137/38; 137/519; 137/533.19
[58] Field of Search .................... 137/38, 43, 519, 533, 137/533.17, 533.19

[56] References Cited

U.S. PATENT DOCUMENTS

| | | | |
|---|---|---|---|
| 516,532 | 3/1894 | Hill | 137/533.19 |
| 1,693,177 | 11/1928 | Hodgart | 137/533.19 X |
| 2,528,600 | 11/1950 | Lombard | 137/43 |
| 3,491,790 | 1/1970 | Sanford | 137/533.19 X |
| 4,023,583 | 5/1977 | Parkinson | 137/43 X |

FOREIGN PATENT DOCUMENTS

| | | | |
|---|---|---|---|
| 851504 | 10/1960 | United Kingdom | 137/533.19 |
| 1178994 | 1/1970 | United Kingdom | 137/519 |
| 2117492 | 10/1983 | United Kingdom | 137/38 |

*Primary Examiner*—Robert G. Nilson
*Attorney, Agent, or Firm*—Krass & Young

[57] ABSTRACT

A check valve for use in a vehicle engine fuel system comprising a fuel storage tank, a fuel feed line for delivering fuel from the tank to the engine, and a fuel return line for returning unused fuel from the engine to the tank. The valve is mounted on the return line in the fuel tank to be operable by a combination of flow-induced pressure reduction and fuel ram pressure to prevent reverse flow of the fuel through the return line in the event of reverse flow conditions.

15 Claims, 2 Drawing Sheets

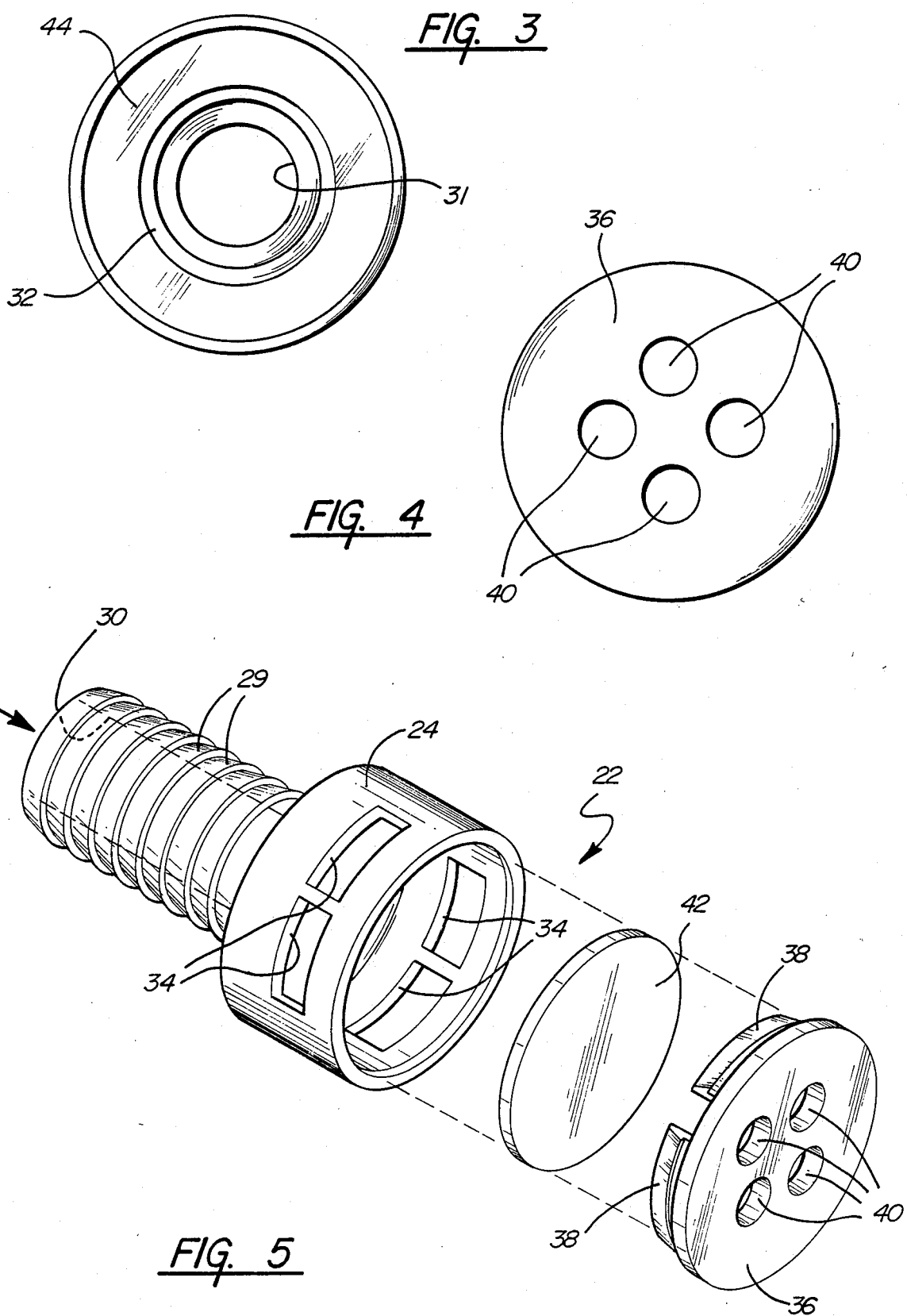

ND EXT4,907,616

CHECK VALVE ASSEMBLY

FIELD OF THE INVENTION

This invention relates to check valves of the type used in fluid flow lines, and more particularly to a check valve for use in a vehicle engine fuel system to prevent reverse fuel flow from the fuel tank through the fuel return line.

BACKGROUND OF THE INVENTION

Vehicle engine fuel systems typically comprise a fuel tank, a fuel feed line running from the tank to the engine, a pump for transferring fuel from the tank through the fuel feed line to the engine, and a return line for returning unused fuel from the engine to the tank. This is a one-way system, and it is typically not desirable to have fuel flowing from the tank through the fuel return line.

In an accident or vehicle roll-over situation such reverse flow can be extremely dangerous, particularly if the return line were ruptured, due to the threat of igniting or fueling a fire with the entire content of the fuel tank as it escaped from the tank through the return line. Reverse fuel flow is also undesirable in a vehicle service situation in which a mechanic might disconnect the return line at the engine to perform repairs. When disconnected, the end of the return line nearest the engine might be lower than the tank and the entire tank might drain through the return line onto the floor of the service facility or into a water drain.

A known method for safeguarding against reverse flow of the fuel from the fuel tank through the return line has been to place a one-way check valve in the return line, typically near or actually in the fuel tank. Such a valve opens to allow fuel to flow from the return line to the tank, but closes to prevent fuel from flowing from the tank back through the return line.

Although check valves are well-known in the art, the prior art valves currently in use to prevent reverse fuel flow from the fuel tank to the return line are often complicated and expensive to manufacture, unreliable, or slow in operation.

SUMMARY OF THE INVENTTION

The present invention is a simple, inexpensive, reliable, fast-acting check valve for use in the fuel return line of a vehicle fuel system, mounted in the end of the return line terminating in the fuel tank to prevent reverse flow of the fuel from the tank back through the return line. The valve comprises a valve body having an inlet for coupling the body to a fuel return line, a valve chamber formed in the valve body having both radial and axial flow ports, and a valve plate disposed in the chamber to be freely axially movable between an open position, in which fuel is allowed to flow from the return line to the tank, and a closed position, in which reverse flow conditions are present and the valve prevents fuel from flowing out of the tank and back into the return line.

In normal operation, the valve plate is held in the open position by the force of the fuel flowing from the return line, through the inlet, into the valve chamber and out the radial ports into the fuel tank. In the presence of reverse flow conditions, e.g., disconnection of the fuel return line at a service station to create a siphon effect, or the vehicle tilted or rolled over and the fuel line ruptured, the valve plate is biased to the closed position by a combination of ram pressure of the fuel through the axial chamber ports onto the upper surface of the plate and by surface tension induced by the reverse flow of the fuel through the radial chamber ports acting on the opposite, lower side of the plate.

In a preferred embodiment of the invention, the valve body is provided with a snap-on closure cap, in which the axial flow ports are formed. Flange means extending axially from the cap into the valve chamber serve both to lockingly engage the cap and valve body and to provide a locator/spacer for the valve plate when in the open position.

In a further preferred embodiment of the invention, the check valve is formed from a suitable fuel-resistant polymer such as Acetel plastic.

In another embodiment, the valve plate has a density greater than the fuel, so that gravity helps hold the valve plate in the open position when the vehicle is upright and helps bias the valve plate to the closed position when the vehicle is tilted or rolled over.

BRIEF DESCRIPTION OF THE DRAWINGS

FIG. 3 is a plan view of the bottom of the valve chamber adjacent the valve inlet opening of the illustrated embodiment;

FIG. 4 is a plan view of the closure cap of the illustrated embodiment; and

FIG. 5 is an exploded perspective view of the valve of the illustrated embodiment.

DETAILED DESCRIPTION OF THE DRAWINGS

Figure 1:
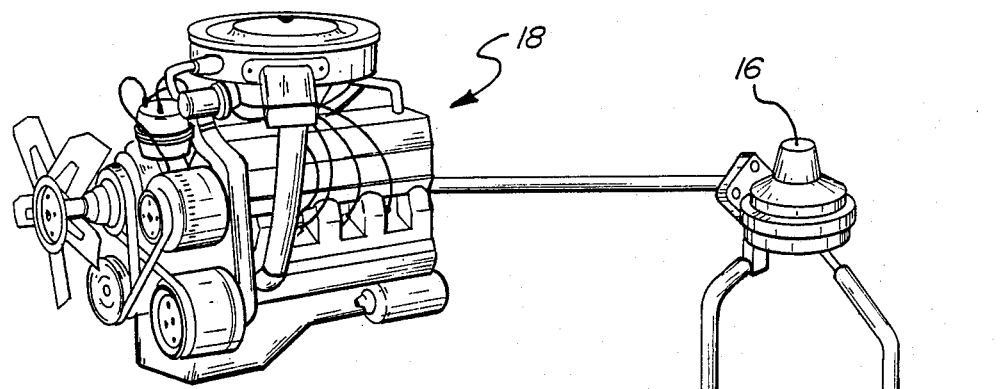
FIG. 1 is a schematic view of a vehicle fuel system.
Figure 1:
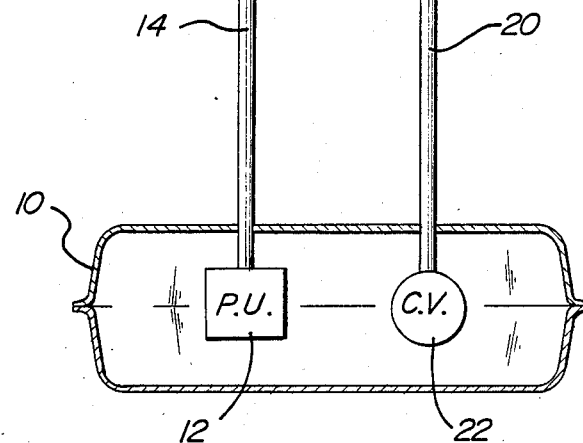

Referring to FIG. 1, a vehicle fuel system is shown comprising a fuel tank 10, a fuel pick-up 12 mounted on fuel feed line 14, fuel pump 16, engine 18, fuel return line 20, and check valve 22 mounted on the end of fuel return line 20 terminating in fuel tank 10. Fuel pump 16 pumps fuel out of tank 10 via pick-up 12 and through feed line 14 to supply engine 18. Unused fuel is returned to tank 10 through return line 20 and check valve 22.

Referring now to FIGS. 2 through 5, check valve 22 can be seen to comprise a generally cylindrical valve body 24 defining a valve chamber 26. A tubular valve inlet 28 of a diameter substantially smaller than that of valve body 24 is formed integrally therewith, extending axially from and concentric with valve body 24. Inlet 28 has formed on its outer surface a plurality of beveled circumferential barbs 29 which resist withdrawal of the valve 22 from the return line 20 once the valve has been properly seated therein. The internal diameter of valve inlet 28 defines a cylindrical axial passage 30 communicating with valve chamber 26 via opening 31. The junction between valve chamber 26 and axial passage 30 at end wall 44 exhibits an annular bead or valve seat 32 having a diameter slightly larger than opening 31. Radial flow ports 34 are formed in the side wall of valve body 24, appearing in the illustrated embodiment as rectangular windows unevenly spaced around the cylindrical wall. Chamber 26 is partially closed at the end opposite the inlet 20 by a circular, snap-on cap 36. The internal side of cap 36 has formed thereon a plurality of circularly arranged, beveled flanges 38 which lockingly engage a circumferential inner lip 37 formed on valve body 24. Flanges 38 also serve as a spacer/locator as hereinafter described. Axial flow ports 40 are formed in cap 36 within the circle of flange portions 38. A disc-shaped valve plate 42 of a diameter slightly less than that of valve chamber 26 is disposed therein to be freely axially movable between valve seat 32 and axial flange portions 38. In the illustrated embodiment valve plate 42 has a density greater than that of the fuel.

It should be noted that the close fit of valve plate 42 in valve chamber 26 allows valve plate 42 to be freely movable only in a substantially axial manner between valve seat 32 and axial flange portions 38. This prevents tipping or misalignment of the valve plate 42 within the valve chamber 26.

In the illustrated embodiment, the entire check valve assembly 22 is formed by injection molding from a suitable fuel-resistant polymer such as, but not limited to Acetel plastic; however, it is to be understood that other suitable materials and combinations of materials may be used.

Operation

Figure 2:
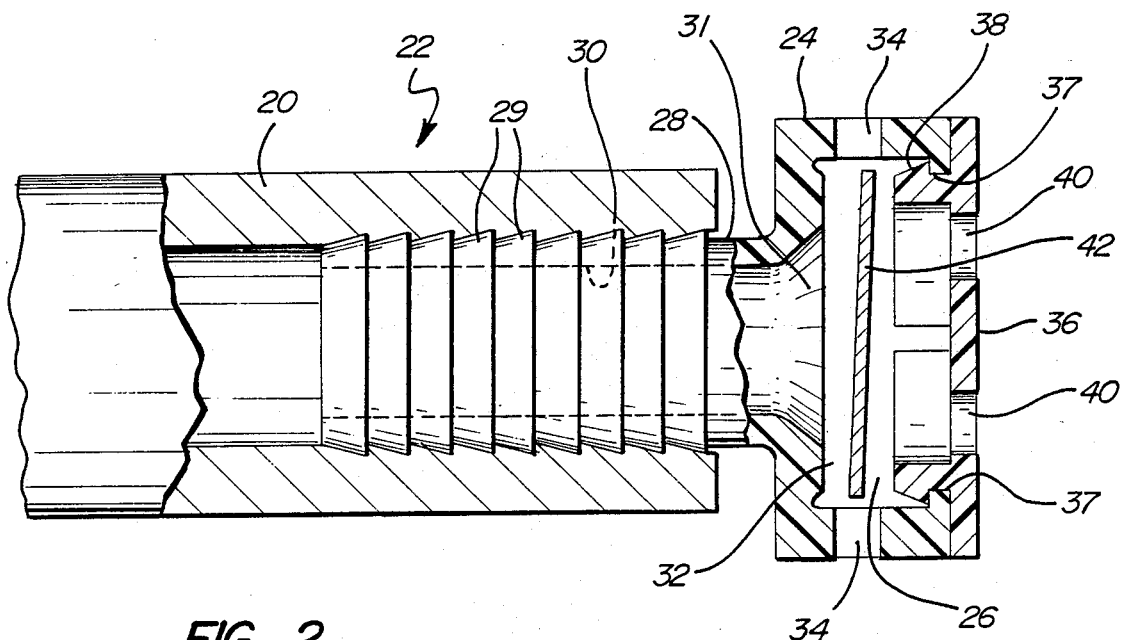
FIG. 2 is a partial sectional view of the valve of the illustrated embodiment inserted in a fuel return line.

Check valve 22 is coupled for operation to the return fuel line 20 by inserting valve inlet 28 substantially entirely into line 20, as shown in FIG. 2. Circumferential barbs 29 on valve stem 28 are beveled on the upstream sides to permit easy insertion of the stem 20, and to provide a fluid-tight frictional fit between the valve stem 28 and the return line 20. Once inserted, the angled barbs 29 engage the walls of return line 20 so as to resist the inadvertent removal or disengagement of valve 22 therefrom.

Excess fuel being returned from engine 18 via return line 20 travels through check valve 22 before entering fuel tank 10 The returning fuel flows through axial passage 30, enters valve chamber 26 and contacts one side of valve plate 42. Both gravity and the force of the flow from return line 20 urge plate 42 into contact with axial flange portions 38 extending from snap-on closure 36 to hold plate 22 in a desired spacing from seat 32 and nearly clear of ports 34 for purposes to be described. This is the open valve position in which radial flow ports 34 are unobstructed by valve plate 42 and are in full communication with valve chamber 26. In this condition fuel drains freely from return line 20.

Substantially all of the fuel entering the valve chamber 26 from axial passage 30 flows out through radial flow ports 34 into fuel tank 10, axial flow ports 40 being essentially blocked by the seal formed by valve plate 42 against axial flange portions 38. This open position is considered the normal operating position of the check valve, with fuel being fairly continuously returned to the tank from the engine. Although the check valve 22 in return line 20 is preferably initially oriented upside-down in the fuel tank, i.e. with the valve body 24 lower than the valve inlet 28 when the vehicle is upright and level, particularly when valve plate 42 has a density greater than the fuel, it may be initially oriented in almost any position.

In the event of reverse flow conditions, in which fuel tends to flow from the fuel tank 10 back into return line 20, check valve 22 operates to almost instantaneously stop such flow. Reverse flow conditions can occur in an accident situation in which, for example, the return line 20 has been ruptured and the vehicle is tilted sharply or rolled over, or in a service situation, in which a person working on a vehicle has disconnected return line 20 from the pump 16 and engine 18 and lowered it below the level of fluid in the tank 10, creating a siphon tending to drain fuel from the tank. In either case, loss of fuel from the tank 10 is undesirable for safety or monetary reasons.

In a roll-over accident situation, the normal, preferred "upside-down" orientation of check valve 22 (wherein the valve inlet 28 is higher than the valve body 24) is suddenly reversed. The weight of the fuel in tank 10 suddenly exerting its force against the outer surface of snap-on cap 36 causes a sudden flow of fuel through axial flow ports 40 against the adjacent face of valve plate 42, ramming it axially toward and against valve seat 32 to the closed valve position in order to seal axial passage opening 31, immediately shutting off reverse flow to the fuel return line 20. At the same time, reverse flow through radial flow ports 34 across the opposite face of valve plate 42 induces a pressure reduction to draw valve plate 42 toward and against valve seat 32. The combined action of ram pressure through axial flow ports 40 against one face of plate 42, and the pressure reduction induced by flow through radial ports 34 across the other face of plate 42, ensures a prompt, positive, and secure shut-off of check valve 22 to prevent loss of fuel from the fuel tank through the return line. The greater density of the valve plate 42 further adds to the security of the shut-off, as the plate tends to sink to the valve seat 32 by gravity.

In a service situation in which the vehicle remains upright and a siphon effect has been created in return line 20, the valve plate 42 is moved to the closed valve position primarily by way of the pressure reduction created by flow through radial flow ports 34 across the face of valve plate 42. Because check valve 22 is maintained in its normal, preferred "upside-down" orientation, the effects of ram pressure on the opposite face of valve plate 42 through axial flow ports 40, are still present. Although gravity still tends to hold the valve open, the density of the plate is such that the reduced pressure and ram pressure are enough to overcome this effect and close the valve.

Axial flow ports formed in cap 36 not only permit reverse ram pressure flow to ram valve plate 42 into the closed valve position against valve seat 32, they also facilitate the return of valve plate 42 to the open valve position against axial flange portion 38 by permitting an escape for fuel that would otherwise be trapped between the valve plate 42 and cap 36.

Although axial flange portions 38 are shown in this preferred illustrated embodiment as being non-continuous about the circumference of cap 36, a continuous annular flange could also be used.

Although the valve plate 42 in the preferred embodiment has a density greater than that of the fuel, a valve plate with a density equal to or less than that of the fuel can also be used with substantially no adverse effect on the operation of the check valve.

It is to be understood that the foregoing description and the illustrated embodiment are not intended to be limiting, but rather to be descriptive of a preferred embodiment of the invention in accordance with 35 USC 112, as many variations of the invention lie within the scope of the appended claims.

I claim:

1. For use in a fuel return line which terminates in a fuel storage tank; a check valve for preventing reverse flow from the tank through the return line comprising:
   a valve body having a hollow interior valve chamber bounded by a side wall, an axial inlet passage opening into the chamber and a valve seat around the passage opening;

first port means formed in the body opposite the inlet and having an axial flow direction relative to the chamber;

second port means formed in the valve body side wall for flow between the chamber and the tank volume external of said valve body and having a transverse flow direction relative to the chamber; and a valve plate disposed within the chamber between the inlet and the first port means; the plate being freely axially movable between a closed position on the valve seat and an open position spaced from the seat; the valve plate in the open position permitting substantially unrestricted flow of fuel from the inlet to and through the second port means via the chamber but substantially blocking flow of fuel from the inlet to and through the first port means via the chamber; said plate being positioned in said open position relative to said second port means such that reverse fuel flow from the tank to said inlet via said chamber draws said plate to said seat to close said valve.

2. Apparatus as defined in claim 1, wherein said valve chamber and said valve plate engage in a close fit such that said valve plate is freely movable between said first and second positions only in an axially translational manner.

3. Apparatus as defined in claim 1 further including spacer means in said chamber for defining the axial spacing between said closed and open positions.

4. Apparatus as defined in claim 1, wherein said axial inlet passage is defined by an axial valve inlet protruding from said valve body for insertion into said fuel return line.

5. Apparatus as defined in claim 4, wherein said valve inlet has formed on its outer surface at least one barbed portion for preventing inadvertent removal of said valve inlet from said fuel return line.

6. For use in a fuel return line which terminates in a fuel storage tank;

a check valve for preventing reverse flow of fuel from said tank through said return line comprising:

a valve body having a valve chamber, an axial inlet passage opening into said valve chamber, and a valve seat around the passage opening;

a valve plate disposed within said valve chamber and freely movable between a closed valve position on said valve seat and an open valve position off said valve seat, said closed and open positions being axially spaced apart within said chamber;

a removable closure disposed on said valve body and including means extending axially into said valve chamber for defining said open valve position;

axial port means in said closure adjacent said open position to permit fuel flow to and from one side of said valve plate opposite said valve seat; and radial port means in said valve body mediate said open and closed positions to permit fuel flow to and from the other side of said valve plate;

wherein said closure engages said valve body in a removable, tight, snap-fit.

7. Apparatus as defined in claim 6, wherein said valve chamber and said valve plate engage in a close fit such that said valve plate is freely movable between said first closed valve position and said second open valve position only in an axially translational manner.

8. Apparatus as defined in claim 6, wherein said axial passage is defined by an axial valve inlet protruding from said valve body for insertion into said fuel return line.

9. Apparatus as defined in claim 8, wherein said valve inlet has formed on its outer surface at least one barbed portion for preventing inadvertent removal of said valve inlet from said fuel return line.

10. Apparatus as defined in claim 6 wherein said valve plate has a density greater than the fuel.

11. For use in a fuel return line which terminates in a fuel storage tank;

a check valve for preventing reverse flow of fuel from said tank through said return line comprising:

a valve body having a valve chamber, an axial inlet passage opening into said valve chamber, and a valve seat around the passage opening;

a valve plate disposed within said valve chamber and freely movable between a closed valve position on said valve seat and an open valve position off said valve seat, said closed and open positions being axially spaced apart within said chamber;

a closure disposed on said valve body in a removable, tight snap-fit and including means extending axially into said valve chamber for defining said open valve position;

axial port means in said closure adjacent said open position to permit fuel flow to and from one side of said valve plate opposite said valve seat;

radial port means in said valve body mediate said open and closed positions to permit fuel flow to and from the other side of said valve plate; wherein said snap-fit is effected by way of said axially extending second position open valve defining means included on said closure.

12. Apparatus as defined in claim 11, wherein said valve chamber and said valve plate engage in a close fit such that said valve plate is freely movable between said first closed valve position and said second open valve position only in an axially translational manner.

13. Apparatus as defined in claim 11, wherein said axial passage is defined by an axial valve inlet protruding from said valve body for insertion into said fuel return line.

14. Apparatus as defined in claim 13, wherein said valve inlet has formed on its outer surface at least one barbed portion for preventing inadvertent removal of said valve inlet from said fuel return line.

15. Apparatus as defined in claim 11, wherein said valve plate has a density greater than the fuel.

* * * * *